Nov. 12, 1968  E. KLEIN  3,410,167
SHEARS FOR TRIMMING THICK METAL SHEETS OR PLATES
Filed Jan. 24, 1966  2 Sheets-Sheet 1

United States Patent Office 3,410,167
Patented Nov. 12, 1968

3,410,167
SHEARS FOR TRIMMING THICK METAL SHEETS OR PLATES
Ernst Klein, Dusseldorf, Germany, assignor to Schloemann Aktiengesellschaft, Dusseldorf, Germany
Filed Jan. 24, 1966, Ser. No. 522,497
Claims priority, application Germany, Jan. 22, 1965, Sch 36,420
7 Claims. (Cl. 83—556)

ABSTRACT OF THE DISCLOSURE

Flat-plate trimming shears, wherein the upper blade beam, driven by a crank and press-rods, executes, on its return stroke, a movement lifting the blade away from the cut edge, this movement being determined by a guiding system, and wherein a lever is arranged on the upper blade beam, and to this lever is pivoted, by way of a thrust arm, the crank of a subsidiiary crank-shaft, the speed of revolution of which corresponds to that of the main crank-shaft, whilst the dead-center positions of the main and subsidiary crank-shafts are different in such a way that upon the rectilinear stroke movement of the upper blade beam a rocking movement is superimposed, the upper blade beam being precisely guided on the stand throughout the entire course of the motion.

---

The upper blades of trimming shears for thick metal plates or sheets are subjected to heavy wear during the return stroke by sliding along the cut edge of the plate. Moreover, it may happen that the plate, during the return stroke, is nipped between the upper blades of two trimming shears opposite to one another on the roller table, and is raised with them. To obviate this defect various shears have already been proposed, in which the shear blade secured to the upper blade beam is lifted away from the cut edge during the return stroke.

Thus for example in one known shearing machine, the upper blade-beam guide, which takes up the chewing pressure, has been constructed as a wedge, which, by displacement against wedge surfaces provided on the stand, forms optionally, during the working stroke, a rigid bearing or abutment for the upper blade beam, or, during the return stroke, permits a horizontal movement thereof in the direction of the chewing pressure.

In another known shearing machine, the guides that take up the chewing pressure are pivotally suspended on their upper side, whilst their under sides are connected with eccentrics, and are controlled by these correspondingly to the desired blade movement.

With the arrangement of the upper blade beams between movable guides, no sufficient reliability of operation is ensured. There is the risk that the guides may become dirty, and consequently may become prematurely worn, because the movement of the upper blade beam during the return stroke depends upon the continually changing friction of the upper blade on the cut edge, and therefore constant contact with the guides cannot be guaranteed. In addition to this, the blade gap has to be readjusted for each stroke, which requires a high degree of accuracy in the control means.

The object of the present invention is to provide flatblade trimming shears, the upper blade of which, with the upper blade beam, executes, during the return stroke, an accurately determined movement lifting it away from the cut edge, the upper blade beam remaining in constant contact with the guides allotted to it.

According to the invention this aim is attained by he feature that on the upper blade beam a lever is provided, to which the crank of a subsidiary or auxiliary crankshaft, the speed of revolution of which corresponds to that of the main crank-shaft, is pivoted by way of a thrust arm, the dead-centre positions of the main and subsisidary crank-shafts being different, in such a way that the straight-line stroke movement of the upper blade beam is supplemented by a superimposed rocking movement, the upper blade beam being accurately guided on the stand throughout the entire course of movement.

According to a further feature of the invention, the crank of the subsidiary crank-shaft is displaced through an angle in the direction of its revolution relatively to the crank of the main crank-shaft. In this manner the blade movement is effected according to an ellipse-like couple curve, which is determined in its course by the angle which, with the crank of the main crank-shaft in a vertical position, the crank of the subsidiary crank-shaft deviates from the vertical.

An ellipse-like movement of the upper blade may however also be obtained, according to a further feature of the invention, by making the distance between the vertical centre lines of the main crankshaft and of the push-rod pivot on the blade beam different from the distance between the vertical centre lines of the subsidiary crankshaft and of the lifting-arm link on the lever, the difference in magnitude determining the blade-beam movement.

In a further development of the invention there is arranged on each side of the upper blade beam a pivot parallel to the blade, and upon it is journalled a slide provided with a corresponding bore, which is slidably guided between slide-pieces arranged vertically on the stand. By the cooperation of the crankshafts with the pivotal suspension of the upper blade beam with vertically displaceable slide, the course of movement of the upper blade beam is fixed at every stage.

For the adjustment of the blade gap the slidepieces are of wedge-shaped construction, and are arranged bearing with opposite inclination on vertical or approximately vertical stand surfaces, and are jointly displaceable relatively to the latter by means of an adjusting device.

Another construction of the invention consists in pivoting slide-shoes on the front and rear sides of the upper blade beam, the slide-shoes located on the front side being gudied on slide rails movable under spring pressure, and the rear slide-shoes being guided on slide-rails on the stand which are immovabled uring the movement of the blade beam. For the adjustment of the blade gap, the rear sliderails are inclined on their rear sides, and are displaceable, relatively to correspondingly inclined bearing surfaces on the stand, by means of a shifting device.

One embodiment of the invention is illustrated by way of example in the accompanying drawings in which.

Figure 1:
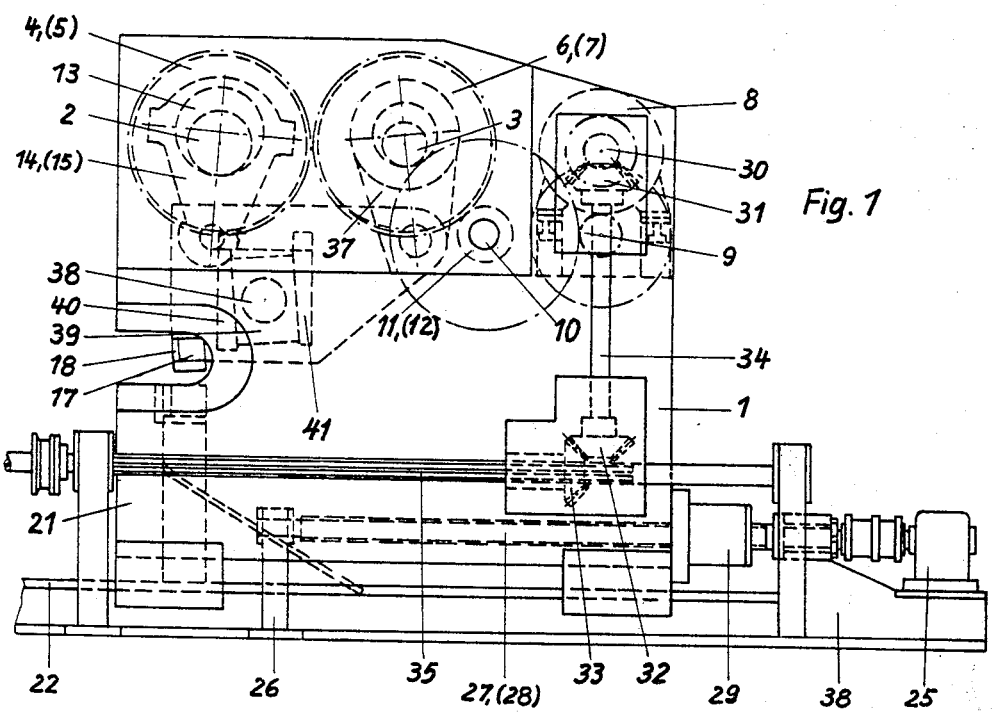
FIGURE 1 shows a side view of a flat-blade trimming shearing machine.
Figure 2:
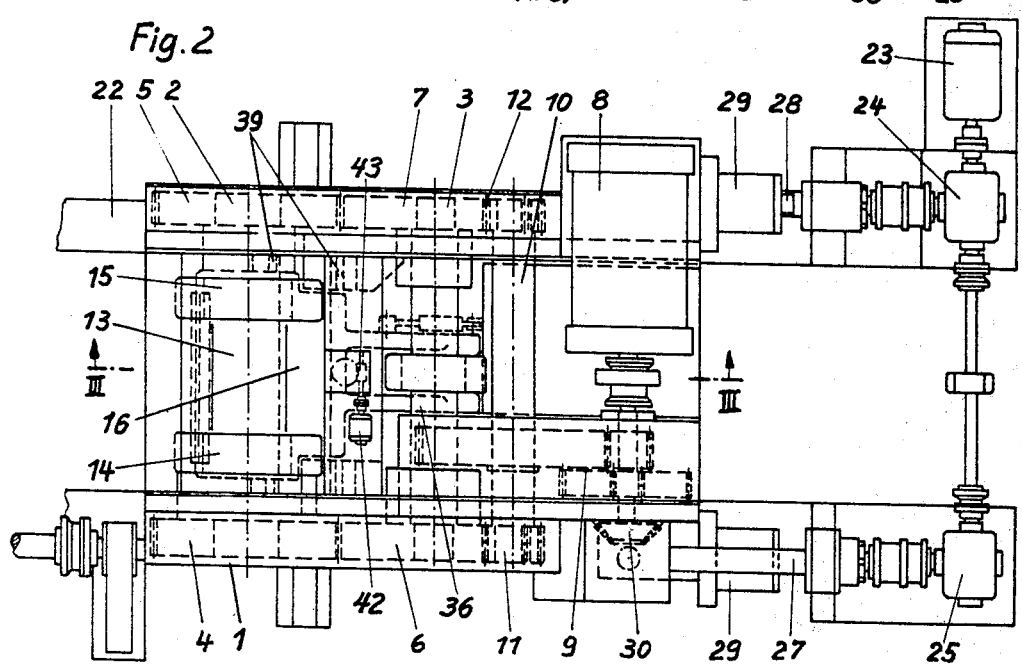
FIGURE 2 shows a plan thereof.
Figure 3:
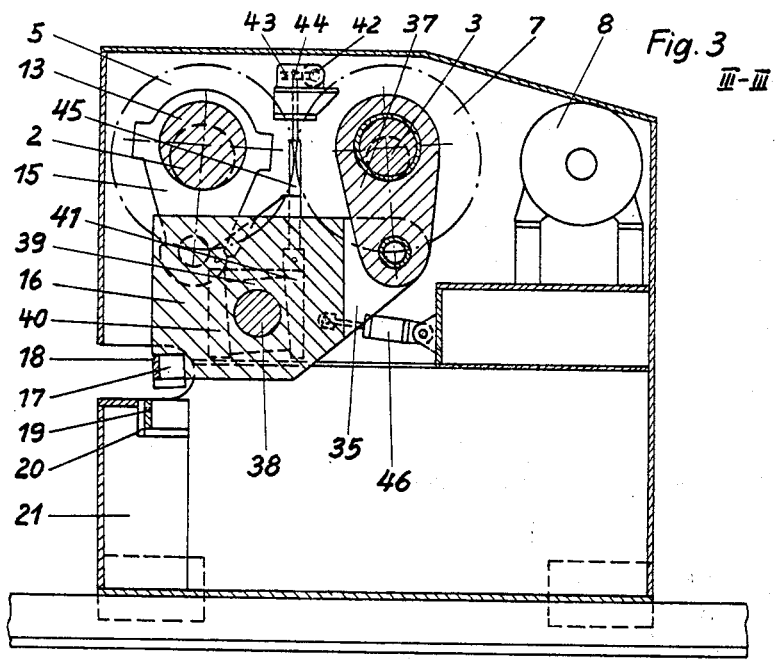
FIGURE 3 shows a side view in section.

In a stand 1 are supported parallel to one another a main crank-shaft 2 and a subsidiary crank-shaft 3, which are operatively connected with one another by toothed wheels 4, 5, 6, and 7 with equal numbers of teeth secured upon their ends. A motor 8 drives the toothed wheels 6 and 7 by way of a gear 9 and two pinions 11 and 12 arranged upon a lengthened shaft 10.

The main crank-shaft 2 accommodates upon its crank 13 press-rods 14 and 15, which are connected with the upper blade beam 16, to which a mounting 17, with the upper blade 18, is secured. The lower blade 19 is anchored with its mounting 20 on the lower blade beam 21.

The shear stand 1 is displaceable, perpendicularly to the roller table, upon slideways 22, for the purpose of adjustment to various breadths of plate or sheet. The power required for this purpose is provided by a motor 23, which, by way of angle drives 24 and 25, drives two spindles 27 and 28, journalled laterally on the stand upon stationary bearing blocks 26, and upon each of these spindles is screwed a nut 29 flanged on the rear of the stand.

In order that synchronism may prevail, between two shearing machines located opposite to one another on the roller table, their two motors 8 are connected by way of bevel wheels 30, 31, 32 and 33, and each vertical shaft 34 is connected jointly to a connecting shaft 35 extending underneath the roller table. This result may however be obtained also by a so-called electric shaft.

The upper blade beam 16 carries towards the rear a forked lever 36, to which a thrust-arm 37 is pivoted, the upper end of which is mounted upon the crank of the subsidiary crank-shaft 3. The crank of the subsidiary crank-shaft 3 is angularly displaced relatively to that of the main crank-shaft 2, in such a way that taking into consideration its direction of revolution, the thrust-arm 37 mounted upon it leads the press-rods 14 and 15 of the main crank-shaft 2. There is thereby superimposed upon the stroke movement of the upper blade beam 16 a rocking motion transmitted from the thrust-arm 37 to the forked lever 36. The upper blade 18 thus describes, during its working and return strokes, an ellipse, the minor axis of which corresponds to its lifting movement away from the cut edge. This need only amount to a few millimetres, so that the blade path, in the region of the material to be cut, deviates from the straight line by at most a tenth of a millimetre. By such a small deviation the cutting conditions are not adversely affected, as the blade gap constitutes at least a multiple of this deviation.

The upper blade beam 16 is incorporated in the combination of a vertical straight-line guide with a pivotal suspension. For this purpose a pivot 38 is anchored parallel to the blade in the upper blade beam 16, and onto this pivot, where it projects beyond the upper blade beam, is slipped a slide 39, provided with a corresponding bearing aperture. Two slide-pieces 40 and 41, of wedge-shaped construction, with opposite inclination are so arranged, one on each side of the slide 39 on the stand 1, as to be displaceable vertically. An adjusting motor 42 effects, by way of a worm gear 43, a spindle 44 and tension rods 45, one on each side of the blade beam, the same displacement of the slide-pieces 40 and 41, whereby a horizontal movement for the adjusting of the blade gap is obtained. For the elimination of play an auxiliary cylinder 46 is employed.

Figure 4:
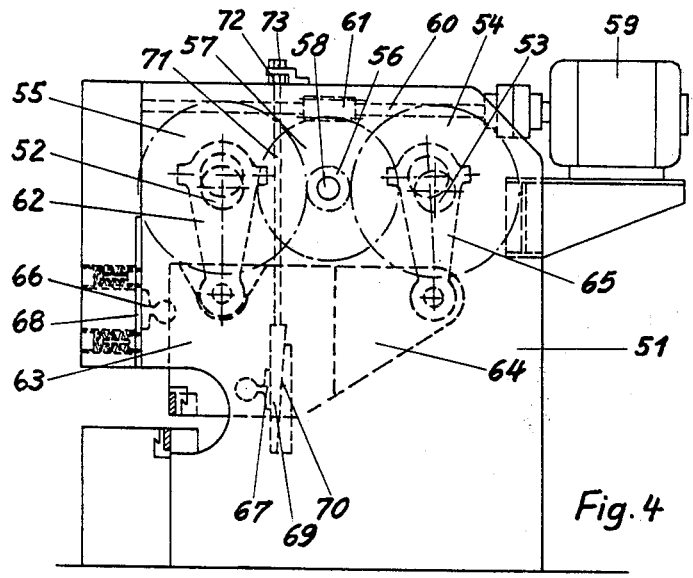
FIGURE 4 shows a side view of another embodiment.

Another example of construction is illustrated in FIGURE 4. In this case, a main crank-shaft 52 and a subsidiary crank-shaft 53 are journalled in a stand 51, and are provided with equal toothed wheels 54, 55, which are driven by a pinion 56. The pinion 56 is mounted on the same shaft 58 as a worm wheel 57, which is driven by a motor 59 by way of a shaft 60, by means of a worm 61 arranged on the latter.

Two press-rods 62 are mounted upon the crank of the main crank-shaft 52, and pivotally connected with the upper blade beam 63. On the back of the upper blade beam 63 there is a forked lever 64, to which is pivoted a thrust-arm 65, the other end of which is mounted upon the crank of the subsidiary crank-shaft 53. The crank of the subsidiary crank-shaft 53 is somewhat angularly displaced is the direction of revolution relatively to the crank of the main crank-shaft 52, so that upon the stroke movement of the upper blade beam 63, transmitted by the press-rods 62, is superimposed a rocking movement transmitted from the subsidiary crank-shaft 53 by way of the thrust-arm 65 and the forked lever 64.

In this embodiment the guides of the upper blade beam 63 are constructed as follows: To the front and rear sides of the blade beam are pivoted slide-shoes 66 and 67, of which those on the front are guided on slide-rails 68 on the stand, which are movable under spring pressure, whilst the rear slide-shoes 67, during the movement of the blade beam, are firmly supported on immovable slide-pieces 69. For the adjustment of the blade gap the slide-pieces 69 are inclined on their rear side, and are slidably arranged relatively to correspondingly inclined bearing surfaces 70 on the stand.

To the slide-pieces 69 is secured a vertical rod 71, which is provided at its upper end with a screw thread, onto which is screwed a nut 72, which is so supported upon the stand as to be axially undisplaceable. A locknut 73 serves for securing the rod 71 in the desired position.

I claim:

1. A flat-bed shearing machine for trimming thick metal sheets and plates, comprising: a machine stand, a main crank-shaft and a subsidiary crank-shaft journaled on the said stand, main and subsidiary cranks on the main and subsidiary crank-shafts, means for driving the main and subsidiary crank-shafts at the same speed of revolution but with a slight angular displacement between their cranks, an upper blade beam, an upper blade carried thereby, press rods pivotally suspending the upper blade beam from the main cranks, a lever extending rearwards from the upper blade beam, and a thrust arm pivotally connecting the said lever with the subsidiary cranks to superimpose a rocking movement upon the substantially vertically up-and-down movement imparted to the upper blade beam by the main crank-shaft.

2. A shearing machine as claimed in claim 1, the angular displacement between the cranks being a forward displacement of the subsidiary crank relatively to the main crank, having regard to the direction of revolution.

3. A shearing machine as claimed in claim 1, the distance between the vertical center lines of the main crank-shaft and of the push-rod pivot on the upper blade beam being different from the distance between the vertical center lines of the subsidiary crank-shaft and of the lift-arm pivot on the lever extending rearwards from the upper blade beam.

4. A shearing machine as claimed in claim 1, further comprising: a pivot extending through the upper blade beam, parallel to the upper blade, a slide formed with a suitable bore in which the said pivot engages, and slide-pieces arranged vertically on the stand for guiding the reciprocating motion of the slide.

5. A shearing machine as claimed in claim 4, further comprising: substantially vertical surfaces on the stand, the said slide-pieces being wedge-shaped, and bearing with opposite inclination against the said substantially vertical surfaces, and adjusting means for jointly displacing the slide-pieces relatively to the said surfaces.

6. A shearing machine as claimed in claim 1, further comprising: slide-shoes pivoted to the front and rear of the upper blade beam, resiliently mounted movable slide-rails against which the slide-shoes in front of the upper blade beam bear, and slide-rails against which the slide-shoes at the rear of the upper blade beam bear, these rear slide-rails being immovable during the movement of the upper blade beam.

7. A shearing machine as claimed in claim 6, the slide-shoes at the rear of the upper blade beam being inclined on the rear side, and the machine further comprising correspondingly inclined bearing surfaces on the stand, and means for adjusting the rear slide-shoes relatively to the said bearing surfaces.

References Cited

UNITED STATES PATENTS

| | | | |
|---|---|---|---|
| 1,878,121 | 9/1932 | Edwards | 83—317 |
| 2,246,552 | 4/1966 | Sieger | 83—556 |

WILLIAM W. DYER, Jr., *Primary Examiner.*

F. T. YOST, *Assistant Examiner.*